(12) United States Patent
Deng et al.

(10) Patent No.: US 11,027,431 B2
(45) Date of Patent: Jun. 8, 2021

(54) AUTOMATIC CALIBRATION METHOD FOR ROBOT SYSTEM

(71) Applicants: Tyco Electronics (Shanghai) Co. Ltd., Shanghai (CN); TE Connectivity Corporation, Berwyn, PA (US)

(72) Inventors: Yingcong Deng, Shanghai (CN); Dandan Zhang, Shanghai (CN); Roberto Francisco-Yi Lu, Shanghai (CN); Yun Liu, Shanghai (CN); Lvhai Hu, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 452 days.

(21) Appl. No.: 16/139,119

(22) Filed: Sep. 24, 2018

(65) Prior Publication Data

US 2019/0022867 A1  Jan. 24, 2019

Related U.S. Application Data

(63) Continuation of application No. PCT/IB2017/051626, filed on Mar. 21, 2017.

(30) Foreign Application Priority Data

Mar. 22, 2016  (CN) .......................... 201610163828.8

(51) Int. Cl.
*B25J 9/16* (2006.01)
*B25J 19/02* (2006.01)

(52) U.S. Cl.
CPC ............ *B25J 9/1692* (2013.01); *B25J 19/02* (2013.01); *G05B 2219/37423* (2013.01);
(Continued)

(58) Field of Classification Search
CPC .................................. B25J 9/16; B25J 19/02
See application file for complete search history.

(56) References Cited

U.S. PATENT DOCUMENTS 6,434,449 B1 * 8/2002 De Smet ................ B25J 9/1692
318/568.1
6,529,852 B2 * 3/2003 Knoll ..................... B25J 9/1692
702/127
(Continued)

FOREIGN PATENT DOCUMENTS

CN  109579766 A  * 4/2019
EP  2390622 A1  11/2011
(Continued)

OTHER PUBLICATIONS

Hoai Nhan Nguyen et al "A New Full Pose Measurement Method for Robot Calibration"; 16 pages (Year: 2013).*
(Continued)

*Primary Examiner* — Kira Nguyen

(57) ABSTRACT

An automatic calibration method of a robot system comprises providing a ball-rod member including a connection rod and a sphere connected to the connection rod, fixing the connection rod to an end execution tool mounted on a flange of a robot, providing distance sensors around a target point, and sensing an actual distance from each of the distance sensors to the sphere. The robot is controlled to move a center of the sphere to the target point in different poses based on the actual distances sensed by the distance sensors. A first transformation matrix of the center of the sphere with respect to a center of the flange is calculated based on pose data of the robot at the target point. A second transformation matrix of a center of the end execution tool with respect to the center of the flange is calculated based on the first transformation matrix.

18 Claims, 5 Drawing Sheets

(52) U.S. Cl.
CPC .............. *G05B 2219/39015* (2013.01); *G05B 2219/39026* (2013.01); *G05B 2219/39054* (2013.01); *G05B 2219/40545* (2013.01)

(56) References Cited

U.S. PATENT DOCUMENTS

| | | | |
|---|---|---|---|
| 8,989,897 B2* | 3/2015 | de Smet | B25J 9/1692 |
| | | | 700/245 |
| 2005/0225278 A1 | 10/2005 | Ban et al. | |
| 2005/0234671 A1 | 10/2005 | Morfino | |
| 2009/0157226 A1* | 6/2009 | de Smet | G01B 11/002 |
| | | | 700/254 |
| 2011/0046782 A1* | 2/2011 | Fixell | B25J 9/1692 |
| | | | 700/251 |

FOREIGN PATENT DOCUMENTS

| | | |
|---|---|---|
| WO | 03035333 A2 | 5/2003 |
| WO | 2015121767 A1 | 8/2015 |

OTHER PUBLICATIONS

PCT Notification, The International Search Report and the Written Opinion of the International Searching Authority, dated Sep. 13, 2017, 15 pages.
Abstract of EP2390622, dated Nov. 30, 2011, 2 pages.
Abstract of WO03035333, dated May 1, 2003, 1 page.

* cited by examiner

AUTOMATIC CALIBRATION METHOD FOR ROBOT SYSTEM

CROSS-REFERENCE TO RELATED APPLICATIONS

This application is a continuation of PCT International Application No. PCT/IB2017/051626, filed on Mar. 21, 2017, which claims priority under 35 U.S.C. § 119 to Chinese Patent Application No. 201610163828.8, filed on Mar. 22, 2016.

FIELD OF THE INVENTION

The present invention relates to a robot system and, more particularly, to an automatic calibration method for a robot system.

BACKGROUND

Calibration for a robot system is generally performed by an artificial teaching method. For example, an operator manually controls a robot to move an end execution tool, also referred to as an end effector, mounted on a flange of the robot to reach the same one target point with a plurality of different poses; for a 6-axis robot, generally with four or more different poses. However, in the above method, it is necessary to determine whether the end execution tool is moved to the same target point by visual examination from the operator. Thereby, an error is unavoidable in the artificial teaching method, and it causes an inaccurate transformation matrix of the center of the end execution tool with respect to the center of the flange of the robot. Furthermore, it is very time-consuming to manually control the robot to reach the same target point with different poses and determine visually whether or not the robot reaches the same target point, greatly decreasing work efficiency. Moreover, if the end execution tool must be frequently replaced in the robot system, the robot system must be re-calibrated after every time the end execution tool is replaced with a new end execution tool, which is very troublesome and time-consuming.

An automatic calibration method for a robot system based on a calibrated vision sensor is also generally known. In the automatic calibration method, the robot is controlled to move the center of the end execution tool mounted on the flange of the robot to the same one target point in various different poses. The automatic calibration method greatly saves time and effort compared with the method of visually judging whether the end execution tool is moved to the target point. However, in the automatic calibration method, it is necessary to identify the center of the end execution tool using the vision sensor. Generally, the end execution tool has a very complex geometric structure, and it is difficult to identify the center of the end execution tool. If the end execution tool needs to be frequently replaced, the center of the end execution tool must be re-identified after every time the end execution tool is replaced with a new end execution tool, which again is very troublesome and time-consuming.

The vision sensor used in the automatic calibration method is generally a camera. The vision sensor must identify the center of the end execution tool based on images captured by the vision sensor, however, the amount of calculation required to identify the center of the end execution tool based on images captured by the vision sensor is very large, decreasing the identifying speed and seriously reducing the calibration efficiency of the robot system.

SUMMARY

An automatic calibration method of a robot system comprises providing a ball-rod member including a connection rod and a sphere connected to the connection rod, fixing the connection rod to an end execution tool mounted on a flange of a robot, providing distance sensors around a target point, and sensing an actual distance from each of the distance sensors to the sphere. The robot is controlled to move a center of the sphere to the target point in different poses based on the actual distances sensed by the distance sensors. A first transformation matrix of the center of the sphere with respect to a center of the flange is calculated based on pose data of the robot at the target point. A second transformation matrix of a center of the end execution tool with respect to the center of the flange is calculated based on the first transformation matrix.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
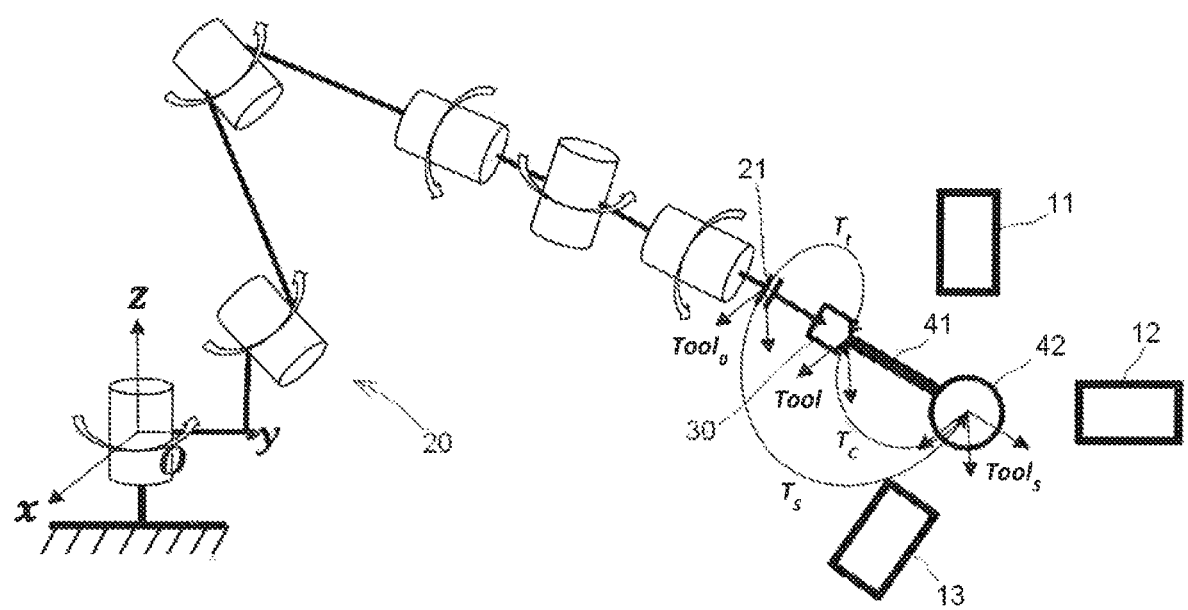
FIG. 1 is a schematic of a robot system according to an embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot system according to an embodiment is shown in FIG. 1. In an embodiment, the robot system is a 6-axis robot system. In other embodiments, the robot system may be constructed as any suitable multi-freedom robot system, for example, a four-axis robot system or a five-axis robot system.

The robot system, as shown in FIG. 1, comprises three distance sensors 11, 12, 13, a 6-axis robot 20, an end execution tool or end effector 30 mounted on a flange 21 of the robot 20, and a ball-rod member 41, 42 fixed to the end execution tool 30. In an embodiment, the robot system further comprises a controller configured to control the robot system based on a pre-stored program.

The ball-rod member 41, 42, as shown in FIG. 1, includes a connection rod 41 and a sphere 42 connected to a first end of the connection rod 41. A second end of the connection rod 41 opposite the first end is fixed to the end execution tool 30 mounted on the flange 21 of the robot 20. In an embodiment, geometrical parameters of the connection rod 41 and the sphere 42 of the ball-rod member are known and constant. Thereby, after the ball-rod member 41, 42 is fixed to the end execution tool 30, a transformation matrix Tc of the center Tool of the end execution tool 30 with respect to the center C of the sphere 42 may be pre-obtained. Because the geometrical parameters of the connection rod 41 and the sphere 42 of the ball-rod member are known and constant, the transformation matrix Tc also is known and constant.

Figure 2:
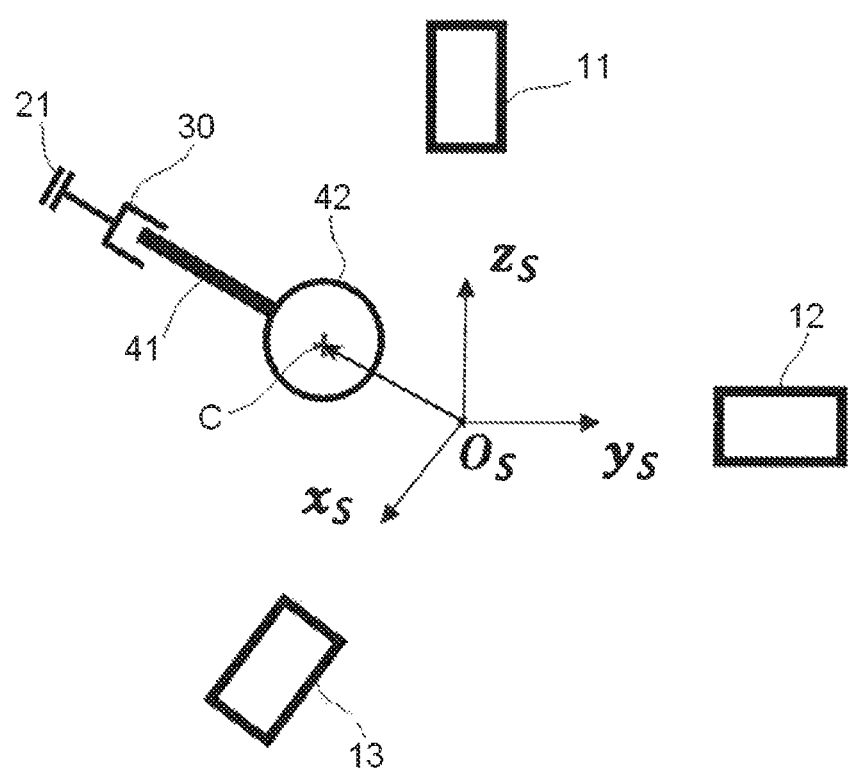
FIG. 2 is a schematic of a plurality of distance sensors and a ball-rod member of the robot system with a sensor coordinate system of the distance sensors.
Figure 3:
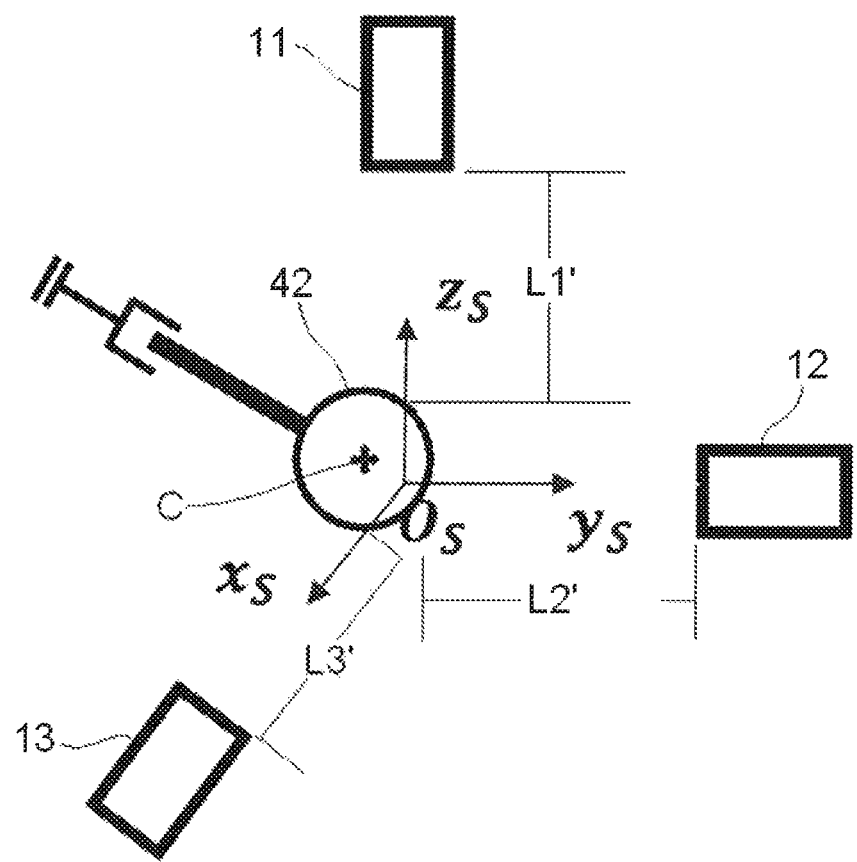
FIG. 3 is a schematic of the distance sensors with an actual distance from each distance sensor to a sphere of the ball-rod member.

As shown in FIGS. 1-3, three distance sensors 11, 12, 13 are provided around a known target point, for example, the point Os shown in FIG. 2, so as to sense three actual distances L1', L2', L3' from the three distance sensors 11, 12, 13 to the surface of the sphere 42, respectively as shown in FIG. 3. The three distance sensors 11, 12, 13 are referred as a first distance sensor 11, a second distance sensor 12, and a third distance sensor 13. In an embodiment, the three distance sensors 11, 12, 13 are each a non-contact distance sensor. In an embodiment, the three distance sensors 11, 12, 13 are each a laser distance sensor or an ultrasonic distance sensor.

As shown in FIG. 3, in practice, when the sphere 42 is moved toward the target point Os, a first actual distance L1' from the first distance sensor 11 to the surface of the sphere 42 is sensed by the first distance sensor 11 in real time, a second actual distance L2' from the second distance sensor 12 to the surface of the sphere 42 is sensed by the second distance sensor 12 in real time, and a third actual distance L3' from the third distance sensor 13 to the surface of the sphere 42 is sensed by the third distance sensor 13 in real time. In an embodiment, as shown in FIG. 3, the first actual distance L1' is a distance from the first distance sensor 11 to the surface of the sphere 42 in an axial direction of the first distance sensor 11, the second actual distance L2' is a distance from the second distance sensor 12 to the surface of the sphere 42 in an axial direction of the second distance sensor 12, and the third actual distance L3' is a distance from the third distance sensor 13 to the surface of the sphere 42 in an axial direction of the third distance sensor 13.

An automatic calibration method of the robot system will now be described with reference to FIGS. 1-5. The method mainly comprises the steps of:

S100: providing the ball-rod member 41, 42 including the connection rod 41 and the sphere 42 connected to the first end of the connection rod 41, as shown in FIG. 1;

S200: fixing the second end of the connection rod 41 to the end execution tool 30 mounted on the flange 21 of the robot 20, as shown in FIG. 1;

S300: providing the three distance sensors 11, 12, 13 around a known target point, so as to sense three actual distances L1', L2', L3' from the three distance sensors 11, 12, 13 to the surface of the sphere 42, respectively;

S400: controlling the robot 20 to move the center C of the sphere 42 to the target point in various different poses, pose#1, pose#2, pose#3, and pose#4, based on the three actual distances L1', L2', L3' sensed by the three distance sensors 11, 12, 13, and calculating a first transformation matrix Ts of a center C of the sphere 42 with respect to the center Tool0 of the flange 21 based on pose data of the robot 20 at the target point in the various different poses; and S500: calculating a second transformation matrix Tt of the center Tool of the end execution tool 30 with respect to the center Tool0 of the flange 21 according to a following formula:

$$Tt = Ts * Tc, \text{ wherein}$$

Tc is a third transformation matrix of the center Tool of the end execution tool 30 with respect to the center of the sphere 42, and Tc is known and constant.

Figure 4:
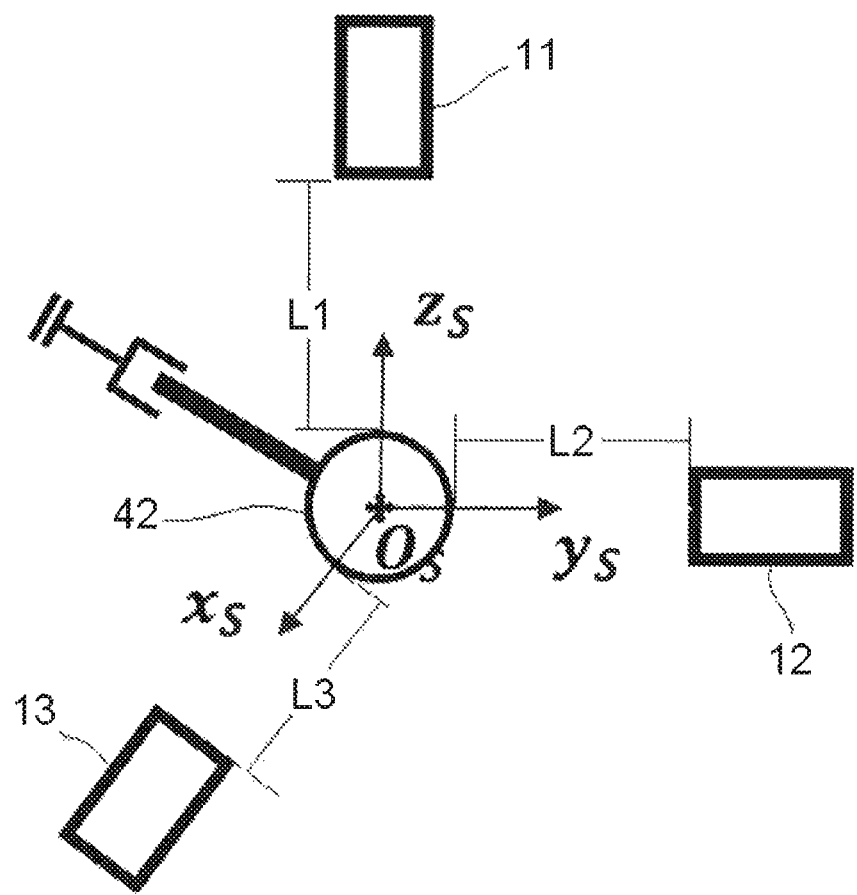
FIG. 4 is a schematic of the distance sensors with a predetermined distance from each distance sensor to the sphere with a center of the sphere at a target point.
Figure 5:
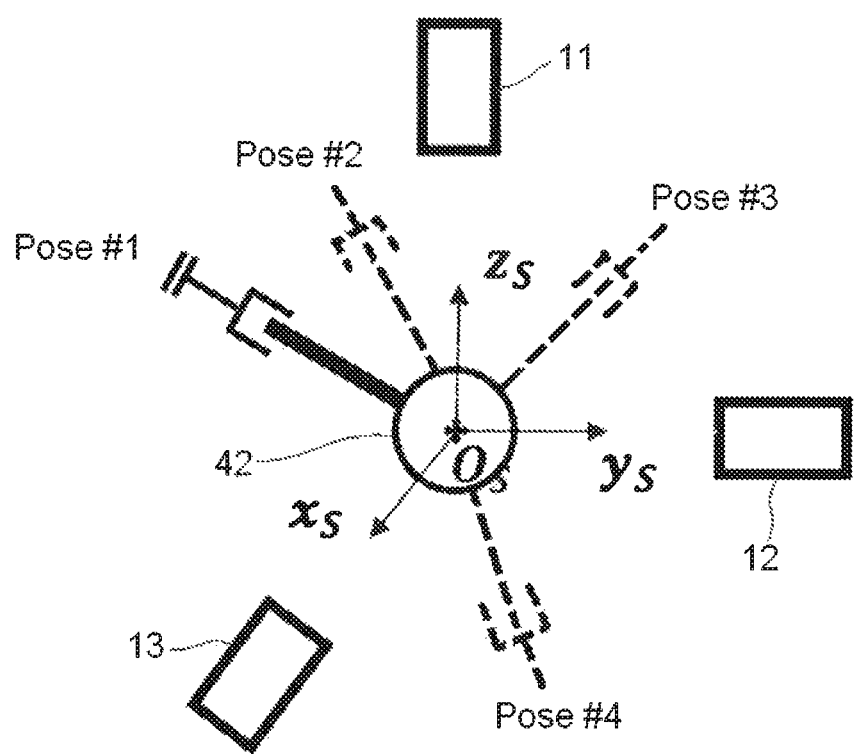
FIG. 5 is a schematic of controlling the robot to move the center of the sphere to the target point in a plurality of different poses.

As shown in FIGS. 1-5, positions of the first distance sensor 11, the second distance sensor 12, and the third distance sensor 13 are known and constant. Thereby, when the center C of the sphere 42 is accurately moved to the known target point Os, the distance from each of the first distance sensor 11, the second distance sensor 12 and the third distance sensor 13 to the surface of the sphere 42 is also known and constant. As shown in FIG. 4, when the center C of the sphere 42 is accurately moved to the known target point, the first distance sensor 11, the second distance sensor 12 and the third distance sensor 13 are distanced from the surface of the sphere 42 by a first predetermined distance L1, a second predetermined distance L2 and a third predetermined distance L3, respectively. As described above, the first predetermined distance L1 from the first distance sensor 11 to the surface of the sphere 42 in the axial direction of the first distance sensor 11, the second predetermined distance L2 from the second distance sensor 12 to the surface of the sphere 42 in the axial direction of the second distance sensor 12, and the third predetermined distance L3 from the third distance sensor 13 to the surface of the sphere 42 in the axial direction of the third distance sensor 13 are known and constant. In various embodiments, the first predetermined distance L1, the second predetermined distance L2 and the third predetermined distance L3 may be equal to or not equal to each other.

In an embodiment, in the above step S400, based on a first distance error between a first actual distance L1' sensed by the first distance sensor 11 and the first predetermined distance L1, a second distance error between a second actual distance L2' sensed by the second distance sensor 12 and the second predetermined distance L2, and a third distance error between a third actual distance L3' sensed by the third distance sensor 13 and the third predetermined distance L3, a closed-loop feedback control is performed on the robot 20 until the first distance error, the second distance error, and the third distance error all become zero. In this way, the center C of the sphere 42 is accurately moved to the target point Os.

In another embodiment, the above step S400 comprises steps of: calculating an actual position of the center C of the sphere 42 in a sensor coordinate system xs, ys, zs based on the three actual distances L1', L2', L3' sensed by the three distance sensors 11, 12, 13, and based on a position error between the actual position of the center C of the sphere 42 in the sensor coordinate system xs, ys, zs and a target position of the target point in the sensor coordinate system xs, ys, zs, performing a closed-loop feedback control on the robot 20 until the position error becomes zero. In this way, the center C of the sphere 42 is accurately moved to the target point Os.

It is not necessary to calculate the actual position of the center C of the sphere 42 in the sensor coordinate system xs, ys, zs. For example, as described above, a closed-loop feedback control on the robot 20 may be performed until the first actual distance L1' sensed by the first distance sensor 11 is equal to the first predetermined distance L1, the second actual distance L2' sensed by the second distance sensor 12 is equal to the second predetermined distance L2, and the third actual distance L3' sensed by the third distance sensor 13 is equal to the third predetermined distance L3. In this way, the center C of the sphere 42 is accurately moved to the target point Os.

In an embodiment, the axis of the first distance sensor 11, the axis of the second distance sensor 12, and the axis of the third distance sensor 13 intersect at the same one intersection point Os, as shown in FIGS. 2-5. In other embodiments, the axis of the first distance sensor 11, the axis of the second distance sensor 12, and the axis of the third distance sensor 13 may not intersect at the same one point. In an embodiment, the intersection point Os of the axis of the first distance sensor 11, the axis of the second distance sensor 12, and the axis of the third distance sensor 13 may be defined as the target point. That is, the intersection point Os of the axis of the first distance sensor 11, the axis of the second distance sensor 12, and the axis of the third distance sensor 13 may be positioned at the target point. In other embodiments, the intersection point Os is not positioned at the target point. In an embodiment, the axis of the first distance sensor 11, the axis of the second distance sensor 12, and the axis of the third distance sensor 13 are orthogonal to each other. In other embodiments, the axis of the first distance sensor 11, the axis of the second distance sensor 12, and the axis of the third distance sensor 13 are not necessarily orthogonal to each other.

In an embodiment, three axes of the sensor coordinate system xs, ys, zs are defined by the axis of the first distance sensor 11, the axis of the second distance sensor 12, and the axis of the third distance sensor 13, respectively; an origin point of the sensor coordinate system xs, ys, zs is positioned at the intersection point Os of the axis of the first distance sensor 11, the axis of the second distance sensor 12, and the axis of the third distance sensor 13.

In an embodiment, as shown in FIGS. 1-5, the step S400 comprises steps of:

S410: controlling the robot 20 to move the center C of the sphere 42 to the target point in a first pose pose#1 based on the three actual distances L1', L2', L3' sensed by the three distance sensors 11, 12, 13, and obtaining a first pose data of the robot 20 at the target point;

S420: controlling the robot 20 to move the center C of the sphere 42 to the target point in a second pose pose#2 based on the three actual distances L1', L2', L3' sensed by the three distance sensors 11, 12, 13, and obtaining a second pose data of the robot 20 at the target point;

S430: controlling the robot 20 to move the center C of the sphere 42 to the target point in a third pose pose#3 based on the three actual distances L1', L2', L3' sensed by the three distance sensors 11, 12, 13, and obtaining a third pose data of the robot 20 at the target point;

S440: controlling the robot 20 to move the center C of the sphere 42 to the target point in a fourth pose pose#4 based on the three actual distances L1', L2', L3' sensed by the three distance sensors 11, 12, 13, and obtaining a fourth pose data of the robot 20 at the target point; and S450: calculating the first transformation matrix Ts of the center C of the sphere 42 with respect to the center Tool0 of the flange 21 based on the obtained first pose data, second pose data, third pose data and fourth pose data of the robot 20.

In an embodiment, in each of the steps S420, S430 and S440, based on a first distance error between a first actual distance L1' sensed by the first distance sensors 11 and the first predetermined distance L1, a second distance error between a second actual distance L2' sensed by the second distance sensors 12 and the second predetermined distance L2, and a third distance error between a third actual distance L3' sensed by the third distance sensors 13 and the third predetermined distance L3, performing a closed-loop feedback control on the robot 20 until the first distance error, the second distance error and the third distance error all become zero. In this way, the center C of the sphere 42 is accurately moved to the target point Os.

In another embodiment, each of the steps S420, S430 and S440 comprises: calculating an actual position of the center C of the sphere 42 in a sensor coordinate system xs, ys, zs based on the three actual distances L1', L2', L3' sensed by the three distance sensors 11, 12, 13, and based on a position error between the actual position of the center C of the sphere 42 in the sensor coordinate system xs, ys, zs and a target position of the target point in the sensor coordinate system xs, ys, zs, performing a closed-loop feedback control on the robot 20 until the position error becomes zero. In this way, the center C of the sphere 42 is accurately moved to the target point Os.

In the shown embodiments, the center C of the sphere 42 is accurately moved to the same one target point Os by controlling the robot 20 in four different poses pose#1, pose#2, pose#3, pose#4 based on the three actual distances L1', L2', L3' sensed by the three distance sensors 11, 12, 13. In other embodiments, the center C of the sphere 42 may be accurately moved to the same one target point Os by controlling the robot 20 in two, three, five or more different poses based on the three actual distances L1', L2', L3' sensed by the three distance sensors 11, 12, 13.

In the above embodiments, the ball-rod member 41, 42 is fixed to the end execution tool 30 mounted on the flange 21 of the robot 20, and the three distance sensors 11, 12, 13 are provided around the known target point Os. In this way, the center C of the sphere 42 may be accurately moved to the same one target point Os by controlling the robot 20 based on the three actual distances L1', L2', L3' sensed by the three distance sensors 11, 12, 13. Thereby, the automatic calibration method disclosed herein does not need to identify the center C of the sphere 42 based on images of the sphere 42 captured by the vision sensor, improving the calibration efficiency of the robot system.

What is claimed is:

1. An automatic calibration method of a robot system, comprising:

providing a ball-rod member including a connection rod and a sphere connected to a first end of the connection rod;

fixing a second end of the connection rod opposite the first end to an end execution tool mounted on a flange of a robot;

providing a plurality of distance sensors around a target point and sensing an actual distance from each of the distance sensors to a surface of the sphere;

controlling the robot to move a center of the sphere to the target point in a plurality of different poses based on the actual distances sensed by the distance sensors and calculating a first transformation matrix Ts of the center of the sphere with respect to a center of the flange based on a plurality of pose data of the robot at the target point in the different poses; and calculating a second transformation matrix Tt of a center of the end execution tool with respect to the center of the flange according to a following formula:

$Tt=Ts*Tc$, wherein

Tc is a third transformation matrix of the center of the end execution tool with respect to the center of the sphere and is known and constant.

2. The method of claim 1, wherein the distance sensors include a first distance sensor, a second distance sensor, and a third distance sensor, and when the center of the sphere is accurately moved to the target point, the first distance sensor is distanced from the surface of the sphere by a first predetermined distance, the second distance sensor is distanced from the surface of the sphere by a second predetermined distance, and the third distance sensor is distanced from the surface of the sphere by a third predetermined distance.

3. The method of claim 2, wherein, based on a first distance error between a first actual distance sensed by the first distance sensor and the first predetermined distance, a second distance error between a second actual distance sensed by the second distance sensor and the second predetermined distance, and a third distance error between a third actual distance sensed by the third distance sensor and the third predetermined distance, the controlling step comprises performing a closed-loop feedback control on the robot until the first distance error, the second distance error, and the third distance error all become zero.

4. The method of claim 2, wherein the controlling step comprises:
calculating an actual position of the center of the sphere in a sensor coordinate system based on the actual distances sensed by the distance sensors; and
based on a position error between the actual position of the center of the sphere in the sensor coordinate system and a target position of the target point in the sensor coordinate system, performing a closed-loop feedback control on the robot until the position error becomes zero.

5. The method of claim 3, wherein an axis of the first distance sensor, an axis of the second distance sensor, and an axis of the third distance sensor intersect at a same intersection point.

6. The method of claim 5, wherein the intersection point of the axis of the first distance sensor, the axis of the second distance sensor, and the axis of the third distance sensor is the target point.

7. The method of claim 6, wherein the axis of the first distance sensor, the axis of the second distance sensor, and the axis of the third distance sensor are orthogonal to each other.

8. The method of claim 4, wherein an axis of the first distance sensor, an axis of the second distance sensor, and an axis of the third distance sensor intersect at a same intersection point.

9. The method of claim 8, wherein the intersection point of the axis of the first distance sensor, the axis of the second distance sensor, and the axis of the third distance sensor is the target point.

10. The method of claim 9, wherein the axis of the first distance sensor, the axis of the second distance sensor, and the axis of the third distance sensor are orthogonal to each other.

11. The method of claim 10, wherein axes of the sensor coordinate system are defined by the axis of the first distance sensor, the axis of the second distance sensor, and the axis of the third distance sensor.

12. The method of claim 11, wherein an origin point of the sensor coordinate system is positioned at the intersection point of the axis of the first distance sensor, the axis of the second distance sensor, and the axis of the third distance sensor.

13. The method of claim 2, wherein the controlling step comprises:
controlling the robot to move the center of the sphere to the target point in a first pose based on the actual distances sensed by the distance sensors and obtaining a first pose data of the robot at the target point;
controlling the robot to move the center of the sphere to the target point in a second pose based on the actual distances sensed by the distance sensors and obtaining a second pose data of the robot at the target point;
controlling the robot to move the center of the sphere to the target point in a third pose based on the actual distances sensed by the distance sensors and obtaining a third pose data of the robot at the target point;
controlling the robot to move the center of the sphere to the target point in a fourth pose based on the actual distances sensed by the distance sensors and obtaining a fourth pose data of the robot at the target point; and
calculating the first transformation matrix Ts based on the obtained first pose data, second pose data, third pose data, and fourth pose data of the robot.

14. The method of claim 13, wherein, based on a first distance error between a first actual distance sensed by the first distance sensor and the first predetermined distance, a second distance error between a second actual distance sensed by the second distance sensor and the second predetermined distance, and a third distance error between a third actual distance sensed by the third distance sensor and the third predetermined distance, controlling the robot to move the center of the sphere to the target point in each of the poses comprises performing a closed-loop feedback control on the robot until the first distance error, the second distance error, and the third distance error all become zero.

15. The method of claim 13, wherein controlling the robot to move the center of the sphere to the target point in each of the poses comprises:
calculating an actual position of the center of the sphere in a sensor coordinate system based on the actual distances sensed by the distance sensors; and
based on a position error between the actual position of the center of the sphere in the sensor coordinate system and a target position of the target point in the sensor coordinate system, performing a closed-loop feedback control on the robot until the position error becomes zero.

16. The method of claim 1, wherein the robot is a multi-axis robot.

17. The method of claim 1, wherein the distance sensors are each a non-contact distance sensor.

18. The method of claim 17, wherein the distance sensors are each a laser distance sensor or an ultrasonic distance sensor.

* * * * *